United States Patent
Burger et al.

[11] Patent Number: 5,163,864
[45] Date of Patent: Nov. 17, 1992

[54] APPARATUS FOR FEEDING SAUSAGE LOOPS TO A SMOKING ROD

[75] Inventors: Karl Burger, Ingoldingen-Muttensweiler; Karl Hummel, Biberach an der Riss, both of Fed. Rep. of Germany

[73] Assignee: Albert Handtmann Maschinenfabrik GmbH & Co. KG, Fed. Rep. of Germany

[21] Appl. No.: 757,264

[22] Filed: Sep. 10, 1991

[30] Foreign Application Priority Data

Oct. 22, 1990 [DE] Fed. Rep. of Germany ... 9014610[U]

[51] Int. Cl.⁵ ............................................. A22C 15/00
[52] U.S. Cl. ........................................ 452/51; 452/186
[58] Field of Search ...................... 452/51, 46, 32, 186

[56] References Cited

U.S. PATENT DOCUMENTS

| | | | |
|---|---|---|---|
| 4,233,709 | 11/1980 | Smith et al. | 452/51 |
| 4,761,854 | 8/1988 | Schnell et al. | 452/51 |
| 4,880,105 | 11/1989 | Kasai et al. | 452/51 |
| 5,064,401 | 11/1991 | Kasai et al. | 452/51 |

FOREIGN PATENT DOCUMENTS 395177 10/1990 European Pat. Off. .
3635412 4/1987 Fed. Rep. of Germany .

*Primary Examiner*—Willis Little
*Attorney, Agent, or Firm*—Finnegan, Henderson, Farabow, Garrett & Dunner

[57] ABSTRACT

Apparatus for feeding a chain of connected sausages and for suspending the sausages in the form of loops on a smoking rod in which the outlet end of the feeding means is located above the path described by the transport hooks and the end of the transport belt, which supports the sausage loops, extends in laterally staggered relationship with respect to the feeding means. Further the transport belt revolves in an approximately horizontal plane and the transport hooks are in each case attached to a downwardly directed supporting arm approximately vertical to the plane of the transport belt, the transport hooks branching off laterally from the supporting arm and being directed obliquely upwardly at an acute angle.

12 Claims, 4 Drawing Sheets

APPARATUS FOR FEEDING SAUSAGE LOOPS TO A SMOKING ROD

The invention relates to an apparatus for feeding a chain of connected sausages, for suspending the sausage chain in the form of loops and for feeding the sausage loops to a smoking rod consisting of a feeding means for the sausage chain in stretched position, and an adjoining transport means in the form of an endless revolving transport belt with transport hooks for the sausage loops.

In a known apparatus of this type (DE-OS 36 35 412) a transport belt is disposed so that it revolves in a vertical plane, the transport belts running approximately horizontally. The suspending of the sausage loops on a transport belt designed in such fashion is difficult. There is the risk that the sausage loops will slide off the transport hooks. The delivery of the sausage loops from the transport hooks to the smoking rod occurs at the front end of the same so that a further revolving belt is required, which moves the loops suspended on the smoking rod forwards on the same with revolving rods until the smoking rod is filled with loops. The transport hooks are attached to the transport belt at fixed distances so that the apparatus can not be used with a wide variety of sausage calibers.

In another known apparatus for feeding sausage loops to a smoking rod (European patent application 0 223 993) the transport belt is disposed so that revolves in an oblique plane. The transport hooks are attached to the belt in the form of wire hooks pivotable about their longitudinal axis. They are pivoted at the front deflecting point of the transport belt in each case by means of an adjusting arm in such fashion that the transport hooks point forwardly approximately horizontally. When passing the deflection point each hooks carries out an upward movement due to the oblique arrangement of the transport belt, each hook experiencing an upward movement and being loaded with a sausage loop. The movement path of the loaded transport hooks is located above the smoking rod. If the number of sausage loops necessary for loading the smoking rod are suspended on the transport hook, the smoking rod is manually guided upwardly. The transport hooks are pivoted about their longitudinal axis in such fashion that the hook itself points downwardly and releases in each case the sausage loop so that a delivery of the sausage loops to the smoking rod takes place. The mechanical pivoting of the transport hooks about their longitudinal axis is relatively complex and leads to possibilities of failure. The transport hooks in the form of wire hooks cannot keep the sausages of a sausage chain at a distance from each other so that the sausage loops can often not be slipped over the smoking rod. In this apparatus, as well, the transport hooks are attached to the transport belt at fixed distances.

The invention is based on the problem of providing such a device in such a manner that it ensures a reliable suspension of the sausage loops and transport of the same over the smoking rod and is simple in construction.

To solve this problem, the invention provides such an apparatus in which the outlet end of the feeding means is located above the path described by the transport hooks and the end of the transport belt, which supports the sausage loops, extends in a laterally staggered relationship with respect to the feeding means. Further that the transport belt revolves in an approximately horizontal plane and the transport hooks are in each case attached to a downwardly directed supporting arm approximately vertical to the plane of the transport belt, the transport hooks branching off laterally from the supporting arm and being directed obliquely upwardly at an acute angle.

With this device, a reliable suspension of the sausage loops on the transport hooks is ensured alone by their shape and the forced path of the sausage loops during delivery, the special form of the transport hooks making it possible to reliably grip and transport any shapes and types of sausages.

It has proved to be advantageous in this connection if each transport hook points obliquely forwardly and outwardly as viewed from above and in the direction of transport.

So that the sausage loops can be transported without disturbance over the smoking rod, each transport hook can be designed with a multi-cornered profile to bring about a spreading apart of the sausage loop, at least at its end adjacent to the supporting arm.

In order to also prevent a sliding off of very tightly stuffed sausages from the transport hook during delivery, each transport hook can end upwardly in a relatively sharp edge.

It is also advantageous if each transport hook extends in outwardly bent fashion as viewed from above.

In particular if the sausage loops consist of straight sausages, it is advantageous for the trouble-free loop formation, if each supporting arm is designed as a repelling plate outwardly directed from the transport belt.

An especially simple mounting of the smoking rod and an especially simple delivery of the sausage loops to the smoking rod can be achieved, if a supporting hook supporting the smoking rod is disposed at least on several supporting arms below the transport hook. In this case it is sufficient for the fixing of the smoking rod if—seen in the transport direction—a stop for the smoking rod supported on the supporting hook is attached in the area of the rear deflection point of the transport belt.

In order to be able to reliably loop especially rigid sausages, an element downwardly deflecting the emerging sausage can be disposed before the end of the feeding means.

So that the sausage loops cannot yield laterally when being gripped by a transport hook, a limiting rod can be provided in the area of the front deflection point of the transport belt, which extends radially within the revolving path of the transport hooks both at the deflection point and in the area of the straight end.

Due to the fact that the transport hooks are a rigid structure, i.e. do not have any mechanically movable element, it is possible in a simple fashion to make the supporting arms on the transport belt detachable and connectable again at different locations. In this fashion a change in the distance between the sausage loops can be provided.

It is advantageous if the driving motor for the transport belt is designed in speed-controllable fashion.

To adapt the apparatus to sausages of different length, the transport belt can be adjustable and lockable at different distances from the outlet of the sausages from the feeding means.

Further features and advantages of the invention result from the following description of an example of embodiment with the associated drawings in which.

Figure 1:
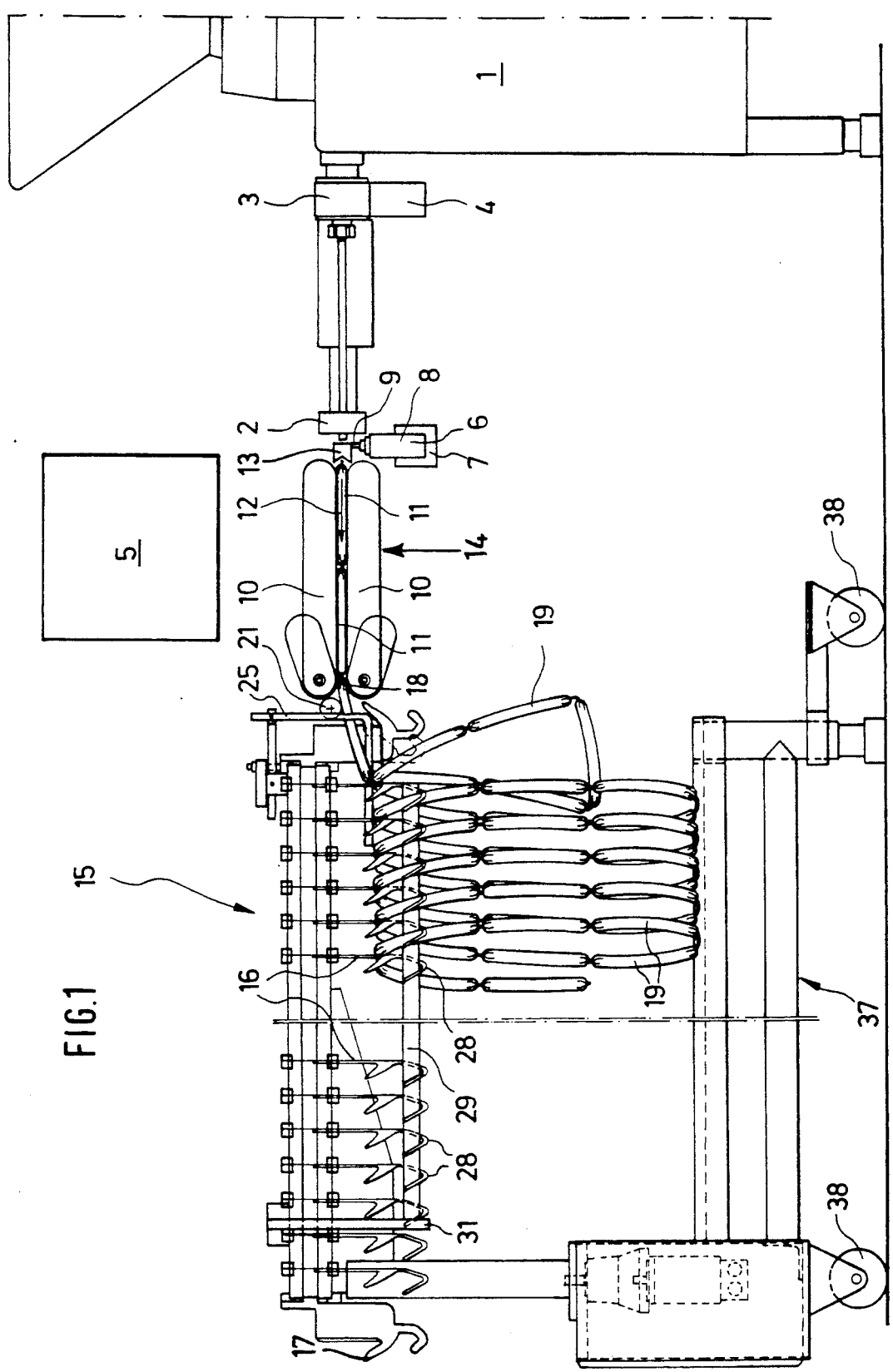
FIG. 1 is a lateral view of the apparatus in cooperation with a known stuffing and portioning machine.

A stuffing or filling machine designated 1 is represented in FIG. 1, from which the stuffing material emerges continuously in skein shape and is stuffed in customary fashion into a sausage skin. The sausage skein formed in this fashion is conveyed through the centric opening of a brake ring 2, which can be rotated by a twist-off gear 3 and co-rotates the sausage skein.

The twist-off gear 3 is driven by an electric motor 4, which is speed controlled by an electronic control unit 5.

Directly downstream of the brake ring 2 the sausage skein passes a separating device which consists of a displacement unit generally designated 6, to form individual sausages in the sausage skein. This displacement unit 6 includes an electric motor 7 which is connected with a gear 8 which has two driving shafts 9.

The electric motor 7 is also speed controlled by the electronic control unit 5.

A displacement element 13 is fitted onto each driving shaft 9 and rigidly connected with it. A feeding means designated in general 14 is connected downstream of the separating device, which consists of two feeding conveyor belts 10. These belts 10 are guided in known fashion around deflection wheels, some of which are connected with a speed-controllable electric motor (not shown) as a driving wheel, which in turn is controlled by the electronic control unit 5.

The feeding conveyor belts rotate in opposite directions and transport the chain of separated sausages 11 in the direction of the arrow 12.

The two driving shafts 9 for the displacement unit 6 project from the gear 8 at a distance and in parallel to each other and are driven synchronously and in opposite directions to periodically bring the elements 13 into contact with the skein and separate it into individual, but connected sausages.

A transport belt designated in general 15 is connected downstream of the feeding means 14, which revolves in a horizontal plane around a longitudinal axis 101.

Figure 3:
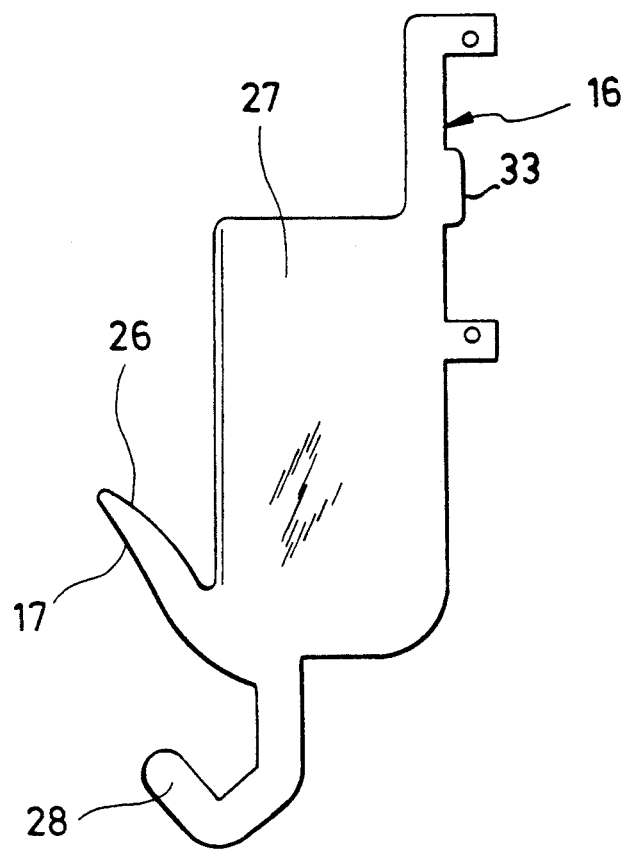
FIG. 3 is a front view of a transport hook.

Supporting arms 16, that are directed downwardly approximately vertical to the plane of the transport belt 15, are attached to the transport belt, one transport hook 17 branching off laterally and outwardly from each one. The transport hooks are directed obliquely upwardly at an acute angle (FIGS. 1 and 3). This angle is approximately 40° as shown in the drawings.

As can be seen from FIG. 1, the outlet end 18 of the feeding means 14 is above the path described by the transport hooks 17.

It can be seen from FIG. 2 that the longitudinal axis 101 of the transport belt 15 carrying the sausage loops 19 is offset from the center line 102 of the outlet end 18 of the feeding means, the purpose of which will be described in more detail below.

FIG. 1 shows an element for deflecting the emerging sausage downwardly in the form of a deflection roller 21 that is located adjacent the outlet end of the feeding means 14.

Figure 2:
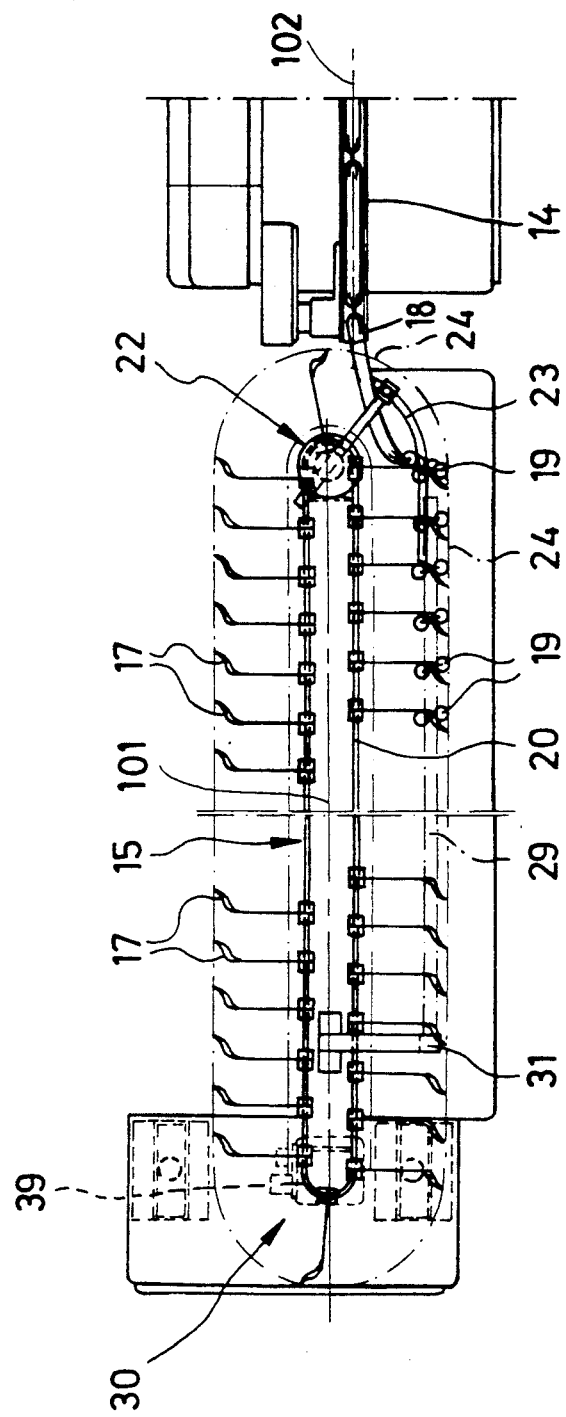
FIG. 2 is a top view of the apparatus.

As can be seen in FIG. 2, a limiting rail 23 is attached in the area of the front or deflection end 22 of the transport belt 15, which extends radially within the revolving path 24 of the transport hooks 17 both in the area of the round deflection end 22 and in the area of the straight leg 20. The limiting rail 23 is adjustable in its position by means of a mounting 25.

Figure 4:
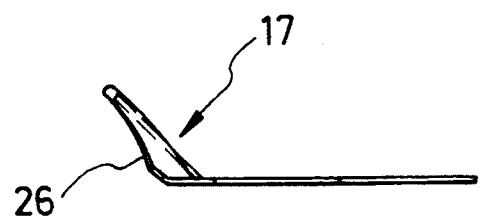
FIG. 4 is a top view of the hook.

As can be seen from FIGS. 1, 2 and 4, each transport hook 17 extends obliquely forwardly and outwardly as seen from above and in the direction of transport.

Each transport hook 17 terminates on its upper end in a relatively sharp edge 26 (FIG. 4). Each of these transport hooks 17 also extends in slightly outwardly bent fashion as seen from above.

Moreover FIG. 3 shows that each supporting arm 16 includes a repelling plate 27 with a supporting hook 28 being disposed below the transport hook 17 so that the smoking rod 29 (FIG. 2) can be supported on such supporting hooks 28. A stop 31 for the smoking rod supported on the supporting hooks 28 is attached in the area of the rear end 30 of the transport belt 15.

As can be seen from FIG. 3, each transport hook 17 has a considerable thickness at least at its end adjacent to the supporting arm 16 or the repelling plate 27, due to the fact that the transport hook 17 has a triangular profile.

Figure 5:
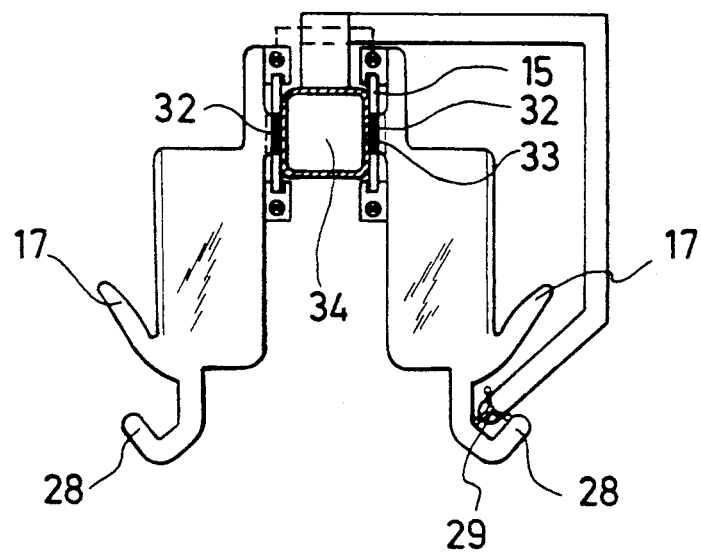
FIG. 5 is a sectional view showing a detail of the transport belt with the transport hooks attached thereto.

An embodiment of the transport belt 15 is shown in FIG. 5.

The transport belt 15 rotates about a central supporting pipe 34.

The transport belt 15 has a trundle-like toothing 32 in its central area, into which a tooth-like projection 33 on the arms 16 engages as carrier.

In this fashion the transport hooks 17 on the transport belt 15 can be readily detached and again connected at different distances.

As can be seen from FIG. 1, the whole transport belt 15 is mounted on a support generally 37, which is adjustable by means of rollers 38 with respect to the end of the feeding means 14.

The mode of operation of the apparatus is as follows:

The connected sausages 11 in the form of a sausage chain are conveyed in an in-line or stretched position by the feeding means 14. The sausages emerging from outlet 18 strikes the deflection roller 21, which deflects them downwardly.

Due to the lateral staggering of the transport belt 15 for supporting the sausage loops with respect to the feeding means 14, a sausage leaving the outlet end of the feeding means 14 will strike the repelling plate 27 of a supporting arm 16 and be and is outwardly deflected. Due to this, the open side of the loop is rotated in the direction of transport. This movement is supported by the tension of the sausage loop already suspended.

The sausage leaving the outlet end of the feeding means 14 thus adopts an obliquely downwardly and outwardly directed position until it is gripped by a transport hook 17 located at the deflection end 22 of the belt at a separating point in the chain as shown in the drawings, and is carried along. Due to the striking of the sausage against the repelling plate 27, an untwisting of the sausages at the separating point is prevented.

When the transport hook 17 grips the sausage it slides downwardly on the oblique hook and is clamped there in the acute angle, the relatively sharp edge 26 on the transport hook being also pressed into tightly stuffed sausages to such an extent that the sausage is reliably held on the transport hook 17 and carried along by it.

If the sausage loops are suspended on the hook 17 at their separating points, the two adjacent sausages are spread apart by the triangular profile of the hook 17 so that the sausage loops can be moved over the smoking rod 29 without any inhibition.

The smoking 29 rod is mounted on the stop 31 at one end. The opposite end projects freely and is supported by the supporting hooks 28 of the transport hooks. All transport hooks 17 need not be equipped with such supporting hooks 28.

The transport belt 15 is equipped with an electric motor 39 as a drive means for rotating the belt.

All electric-motor drive means can be controlled by the electronic control unit 5 so that it is possible to adapt the operating mode of the transport belt to all conditions preset by the stuffing and portioning machine and the feeding means.

It is advantageous to move the transport belt 15 intermittently, so that it will be stopped for a very short period of time each time a transport hook has arrived at the deflection end 22 and has passed through 180°.

The starting of the corresponding transport hook in the area of the deflection end 22 can be carried out by means of a sensor.

The feeding means 14 can also be represented by means other than feeding belts 10. Such a means may also e.g. consist of the brake ring 2.

We claim:

1. Apparatus for feeding a chain of connected sausages in the form of loops onto a smoking rod comprising feeding means for feeding the sausage chain in an in-line position to an outlet end thereof and transport means for receiving the chain from the outlet end of the feeding means and for suspending and transporting the chain in the form of loops thereon from said outlet end to the smoking rod and for feeding the suspended loops onto the smoking rod, said transport means comprising an endless transport belt that revolves in a horizontal plane in an elongated loop around a longitudinal axis, drive means for revolving said belt, a plurality of spaced supporting arms attached to said transport belt for travel therewith that extend downwardly approximately vertical to the plane of the belt, each of said arms having a repelling plate adapted to be located opposite the outlet end of the feeding means at the beginning of a transport leg of travel of the belt for deflecting the chain of sausages downwardly and outwardly to form loops in the chain and transport hooks branching off laterally from the arms below the repelling plate and extending obliquely upwardly at an acute angle for holding the sausage loops and transporting them along said transport leg of travel and onto said smoking rod as the belt revolves, the longitudinal axis of the transport belt being laterally offset from the outlet end of the feeding means so that the sausages exiting from the feeding means will strike the repelling plate of a supporting arm and the transport hooks of the arms describing a path of travel spaced below the outlet end of the feeding means.

2. The apparatus of claim 1, wherein in each transport hook also extends obliquely forwardly and outwardly from the arm with respect to the direction of travel of the transport belt.

3. The apparatus of claim 1 or 2, wherein each transport hook has a polygonal profile to bring about a spreading apart of the sausage loops in the vicinity of the hooks.

4. The apparatus of claim 1, wherein each transport hook ends upwardly in a relatively sharp edge.

5. The apparatus of claim 1, wherein each transport hook extends in an outwardly bent fashion.

6. The apparatus of claim 1, including a supporting hook located below the transport hooks on at least some of the supporting arms for supporting the smoking rod.

7. The apparatus of claim 6, including a stop for the smoking rod located in the area of the end of said transport leg of travel of the belt.

8. The apparatus of claim 1, including a deflection element located adjacent the outlet end of the feeding means for deflecting the chain of sausages exiting therefrom down into contact with the repelling plate of a supporting arm of the transport belt.

9. The apparatus of claim 1, including a limiting rail adjacent the beginning of the transport leg of the transport belt that extends radially within the revolving path of the transport hooks.

10. The apparatus of claim 1, wherein the supporting arms are detachably connected to the transport belt.

11. The apparatus of claim 1, including a motor for driving said transport belt and electronic control means for controlling the speed of the motor.

12. The apparatus of claim 1, including means for adjusting the location of the transport belt with respect to the outlet end of the feeding means.

* * * * *